United States Patent
Umayahara et al.

(10) Patent No.: US 8,980,487 B2
(45) Date of Patent: Mar. 17, 2015

(54) FUEL CELL SYSTEM AND ACTIVATING COMPLETION DEGREE DISPLAYING METHOD OF THE SAME

(75) Inventors: Kenji Umayahara, Aichi (JP); Atsushi Imai, Gamagori (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 870 days.

(21) Appl. No.: 12/595,738

(22) PCT Filed: Jun. 16, 2008

(86) PCT No.: PCT/JP2008/061370
§ 371 (c)(1), (2), (4) Date: Oct. 13, 2009

(87) PCT Pub. No.: WO2008/153222
PCT Pub. Date: Dec. 18, 2008

(65) Prior Publication Data
US 2010/0112390 A1 May 6, 2010

(30) Foreign Application Priority Data
Jun. 15, 2007 (JP) .................. 2007-158724

(51) Int. Cl.
*H01M 8/04* (2006.01)
(52) U.S. Cl.
CPC ........ *H01M 8/0432* (2013.01); *H01M 8/04223* (2013.01); *Y02E 60/50* (2013.01)
USPC ............................ 429/428; 429/429; 429/433
(58) Field of Classification Search
USPC ......................... 429/428, 429, 433
See application file for complete search history.

(56) References Cited

U.S. PATENT DOCUMENTS

| 2004/0142216 A1* | 7/2004 | Wakabayashi et al. ......... 429/13 |
| 2005/0181246 A1 | 8/2005 | Nakaji |

(Continued)

FOREIGN PATENT DOCUMENTS

| DE | 112007001137 T5 | 4/2009 |
| JP | 2001-257011 A | 9/2001 |

(Continued)

OTHER PUBLICATIONS

Machine translation of JP 2004-079454, Otani Akihito, Aug. 22, 2002.*

*Primary Examiner* — Jane Rhee
(74) *Attorney, Agent, or Firm* — Kenyon & Kenyon LLP

(57) ABSTRACT

The progress of activation of a fuel cell is appropriately transmitted in accordance with the rise of the temperature of the fuel cell, and an estimated time till the completion of the activation is displayed with higher accuracy. To realize this, the current percentage of a fuel cell temperature is displayed on a gauge (G) which displays, as a starting point, the temperature of the fuel cell at the start of the activation and which displays, as an end point, the temperature of the fuel cell at the completion of the activation. The percentage of the temperature is displayed as the estimated time till the completion of the activation, whereby an adverse effect due to a low accuracy in the case of the estimation of the time is eliminated. When the fuel cell is activated for a failure check, the percentage of an actually elapsed time with respect to a time required to complete the failure check may be displayed on the gauge (G). After comparing the percentage of the actually elapsed time with respect to the time required to complete the failure check with the percentage of the temperature of the fuel cell, the smaller value is preferably displayed.

6 Claims, 3 Drawing Sheets

(56) References Cited

U.S. PATENT DOCUMENTS

| | | |
|---|---|---|
| 2006/0083968 A1 | 4/2006 | Inai et al. |
| 2009/0208786 A1* | 8/2009 | Manabe et al. ................. 429/17 |

FOREIGN PATENT DOCUMENTS

| | | |
|---|---|---|
| JP | 2003-217630 A | 7/2003 |
| JP | 2004-79454 A | 3/2004 |
| JP | 2004-158333 A | 6/2004 |
| JP | 2004-186135 A | 7/2004 |
| JP | 2004-342617 A | 12/2004 |
| JP | 2006-012472 A | 1/2006 |
| JP | 2006-179276 A | 7/2006 |
| JP | 2006-196240 A | 7/2006 |
| JP | 2007-305346 A | 11/2007 |
| WO | WO 2005/011034 A1 | 2/2005 |
| WO | WO 2007/129586 * | 11/2007 .............. H01M 8/04 |

* cited by examiner

US 8,980,487 B2

FUEL CELL SYSTEM AND ACTIVATING COMPLETION DEGREE DISPLAYING METHOD OF THE SAME

This is a 371 national phase application of PCT/JP2008/061370 filed 16 Jun. 2008, which claims priority to Japanese Patent Application No. 2007-158724 filed 15 Jun. 2007, the contents of which are incorporated herein by reference.

BACKGROUND OF THE INVENTION

1. Field of the Invention

The present invention relates to a fuel cell system and an activating completion degree displaying method of the system. More particularly, it relates to the improvement of the display of information at the start of the activation of a fuel cell.

2. Description of Related Art

In general, a fuel cell (e.g., a polymer electrolyte fuel cell) has a constitution in which a plurality of cells each including an electrolyte sandwiched between separators are stacked. Moreover, in addition to such a fuel cell, a piping system for supplying or discharging a reactant gas (a fuel gas or an oxidizing gas) to or from the fuel cell, a power system for charging or discharging a power, a control system for generally controlling the whole system and the like constitute a fuel cell system.

In such a fuel cell system, in general, a certain degree of time is required from a time when the fuel cell is activated to a time when the power can be supplied (a so-called ready-on state). Therefore, for example, a certain fuel cell car includes means for displaying a time elapsed from the start of the activation to the ready-on state in which the power can be supplied (e.g., see Patent Document 1).

[Patent Document 1] Japanese Patent Application Laid-Open No. 2004-158333

SUMMARY OF THE INVENTION

However, as described above, heretofore, a time estimated from the temperature of a fuel cell has been displayed as a time required to obtain a ready-on state (an activating completion state), so that an estimation accuracy is poor, and a remaining time till the completion of the activation increases or decreases sometimes.

To solve the problem, an object of the present invention is to provide a fuel cell system capable of displaying a time till the completion of the activation of the fuel cell with higher accuracy, and an activating completion degree displaying method of the system.

Usually in the fuel cell system, it is difficult to predict the time required till the completion of the activation of the fuel cell only from the temperature, and hence it is difficult to correctly inform a user of a waiting time in the present situation. The present inventor has repeatedly investigated this respect to obtain a new finding for solving such a problem. The present invention has been developed based on such a finding, and is a fuel cell system comprising a fuel cell which generates a power by the electrochemical reaction of a fuel gas and an oxidizing gas, wherein the current percentage of a fuel cell temperature is displayed on a gauge which displays, as a starting point, the temperature of the fuel cell at the start of activation and which displays, as an end point, the temperature of the fuel cell at the completion of the activation.

According to such a fuel cell system, it is possible to accurately inform a user of an estimated time till the completion of the activation through the percentage of the temperature displayed on the gauge. Additionally, in the present invention, the time is not predicted only from the temperature, but the time is displayed on the gauge based on the temperature itself. That is, the time is not estimated, but the only ratio of the temperature is displayed as a target, and hence it is possible to inform a waiting time more correctly than before. That is, according to this fuel cell system, the percentage of the temperature is displayed as the estimated time for the completion of the activation, whereby an adverse effect due to the poor accuracy of the estimation of the time can be eliminated.

In this case, when the fuel cell is activated for a failure check, the percentage of an actually elapsed time with respect to a time required to complete the failure check is preferably displayed on the gauge. In such a fuel cell system, an estimated time for the completion of the failure check can be displayed on the gauge which displays the estimated time for the completion of the activation in accordance with a temperature rise.

Moreover, after comparing the percentage of the actually elapsed time with respect to the time required to complete the failure check with the percentage of the temperature of the fuel cell, the smaller value is preferably displayed. Both the estimated time for the completion of the activation in accordance with the temperature rise and the estimated time for the completion of the failure check can be taken into consideration to display the estimated time for the completion of the activation.

Furthermore, an activating completion degree displaying method of a fuel cell system according to the present invention comprises the steps of displaying the current percentage of the temperature of a fuel cell on a gauge which displays, as a starting point, the temperature of the fuel cell at the start of activation and which displays, as an end point, the temperature of the fuel cell at the completion of the activation, to display an estimated time for the completion of the activation.

DETAILED DESCRIPTION OF PREFERRED EMBODIMENT

Hereinafter, a preferable embodiment of the present invention will be described with reference to the drawings.

FIGS. 1 to 4 show the embodiment of the present invention. A fuel cell system according to the present invention is configured to display the current percentage of the temperature of a fuel cell on a gauge G which displays, as a starting point, the temperature of a fuel cell 2 at the start of activation and which displays, as an end point, the temperature of the fuel cell 2 at the completion of the activation. Hereinafter, first the whole constitution of a fuel cell system 1 including the fuel cell 2 and the like will be described, and then a specific constitution of a gas-liquid separation unit 30 incorporated in this fuel cell system 1 will be described.

Figure 1:
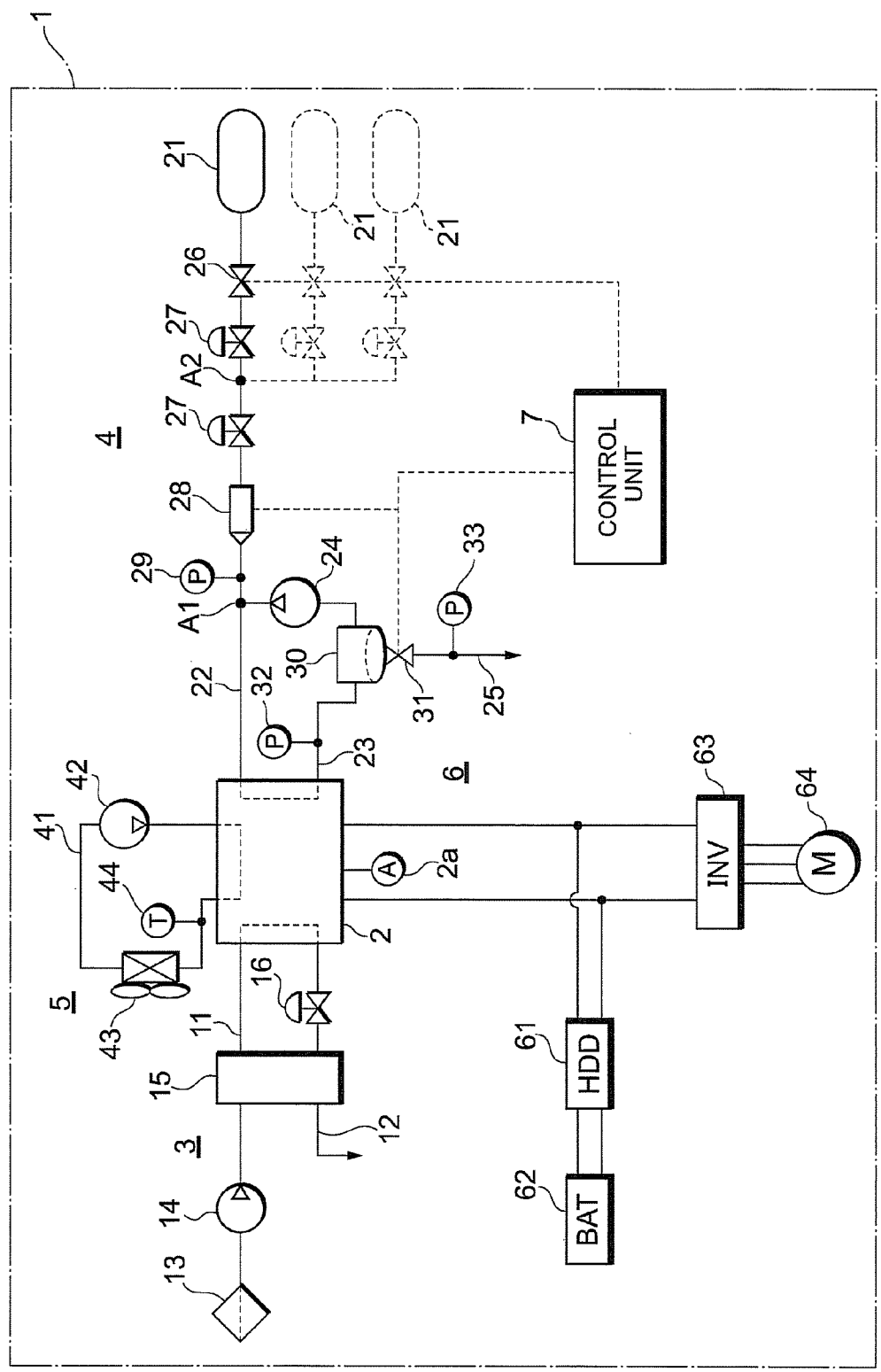
FIG. 1 is a constitution diagram of a fuel cell system in one embodiment of the present invention.

FIG. 1 shows the schematic constitution of the fuel cell system 1 mounted in a fuel cell hybrid vehicle. It is to be noted that here one example of the system applicable as a car-mounted power generation system of the fuel cell hybrid vehicle will be described, but this fuel cell system 1 may be utilized as a power generation system mounted in various mobile bodies (e.g., a ship, an airplane, etc.) or a self-sustainable apparatus such as a robot, or as a stationary power generation system.

The fuel cell system 1 in the present embodiment includes the fuel cell 2 which receives a supplied reactant gas (an oxidizing gas and a fuel gas) to generate a power by an electrochemical reaction; an oxidizing gas piping system 3 which supplies air as the oxidizing gas to the fuel cell 2; a fuel gas piping system 4 which supplies a hydrogen gas as the fuel gas to the fuel cell 2; a refrigerant piping system 5 which supplies a refrigerant to the fuel cell 2 to cool the fuel cell 2; a power system 6 which charges/discharges the power of the system; and a control unit 7 which generally controls the whole system.

The fuel cell 2 is, for example, a polymer electrolyte fuel cell, and has a stack structure in which a large number of unit cells are stacked. Each unit cell has an air pole on one face of an electrolyte constituted of an ion exchange membrane, and a fuel pole on the other face, and further has a pair of separators which sandwich the air pole and the fuel pole between both sides. The fuel gas is supplied to a fuel gas passage of one separator, the oxidizing gas is supplied to an oxidizing gas passage of the other separator, and further these reactant gases cause a chemical reaction to generate the power. A current sensor 2a for detecting a current during the power generation is attached to this fuel cell 2.

The oxidizing gas piping system 3 includes an air supply passage 11 through which the oxidizing gas to be supplied to the fuel cell 2 flows, and an exhaust passage 12 through which an oxidizing off gas discharged from the fuel cell 2 flows. The air supply passage 11 is provided with a compressor 14 which takes the oxidizing gas through a filter 13, and a humidifier 15 which humidifies the oxidizing gas fed under pressure by the compressor 14. The compressor 14 is driven by a motor (not shown) to take the oxidizing gas from the atmosphere. Moreover, the oxidizing off gas flowing through the exhaust passage 12 passes through a back pressure regulation valve 16, is subjected to water content exchange between the gas and the humidifier 15, and is then finally discharged as an exhaust gas from the system to the atmosphere.

The fuel gas piping system 4 has a fuel tank 21 as a hydrogen supply source; a hydrogen supply passage 22 through which the hydrogen gas to be supplied from the fuel tank 21 to the fuel cell 2 flows; a circulation passage 23 which returns a hydrogen off gas (a fuel off gas) discharged from the fuel cell 2 to a joining part A1 of the hydrogen supply passage 22; a hydrogen pump 24 which feeds under pressure, to the hydrogen supply passage 22, the hydrogen off gas in the circulation passage 23; and a gas/water discharge passage 25 branched from and connected to the circulation passage 23.

The fuel tank 21 is constituted of, for example, a high-pressure tank or made of a hydrogen-occlusion alloy or the like, and a plurality of tanks are mounted in a fuel cell hybrid vehicle of the present embodiment so that, for example, 35 MPa or 70 MPa of hydrogen gas can be received. When a block valve 26 described later is opened, the hydrogen gas flows from the fuel tank 21 to the hydrogen supply passage 22. The pressure of the hydrogen gas is finally reduced to, for example, about 200 kPa by regulators 27 and an injector 28 described later, and the gas is supplied to the fuel cell 2. It is to be noted that in the present embodiment, this fuel tank 21 is used as the hydrogen supply source, and additionally, the hydrogen supply source may be constituted of a reformer for forming a reformed hydrogen-rich gas from a hydrocarbon-based fuel and a high-pressure gas tank for accumulating the pressure of the reformed gas formed by this reformer and brought into a high-pressure state.

The hydrogen supply passage 22 is provided with the block valve 26 which blocks or allows the supply of the hydrogen gas from the fuel tank 21, the regulators 27 which regulate the pressure of the hydrogen gas, and the injector 28. Moreover, a pressure sensor 29 for detecting the pressure of the hydrogen gas in the hydrogen supply passage 22 is provided on the downstream side of the injector 28 and the upstream side of the joining part A1 between the hydrogen supply passage 22 and the circulation passage 23. Furthermore, on the upstream side of the injector 28, a pressure sensor and a temperature sensor (not shown) for detecting the pressure and the temperature of the hydrogen gas in the hydrogen supply passage 22, respectively, are provided. Information on a gas state (the pressure, the temperature) of the hydrogen gas detected by the pressure sensor 29 or the like is used for the feedback control or purge control of the injectors 28 described later.

The regulator 27 is a device which regulates an upstream pressure (a primary pressure) to a preset secondary pressure. In the present embodiment, a mechanical pressure reduction valve for reducing the primary pressure is employed as the regulator 27. As the constitution of the mechanical pressure reduction valve, it is possible to employ a known constitution having a housing including a back pressure chamber and a pressure regulation chamber with a diaphragm formed between the chambers, so that the primary pressure is reduced to a predetermined pressure as the secondary pressure in the pressure regulation chamber by a back pressure in the back pressure chamber.

The injector 28 is an electromagnetic driving type opening/closing valve in which a valve body is directly driven by an electromagnetic driving force for a predetermined driving period and detached from a valve seat, whereby a gas flow rate or a gas pressure can be regulated. The injector 28 includes the valve seat having injection holes which inject a gas fuel such as the hydrogen gas, and also includes a nozzle body which supplies and guides the gas fuel to the injection holes, and the valve body movably received and held in an axial direction (a gas flow direction) with respect to this nozzle body to open or close the injection holes. In the present embodiment, the valve body of the injector 28 is driven by, for example, a solenoid as an electromagnetic driving device. When a pulsed excitation current supplied to this solenoid is turned on or off, the opening area of the injection holes can be switched to two stages, multiple stages or a stepless manner. Furthermore, when the gas injection time and gas injection timing of the injector 28 are controlled by a control signal output from the control unit 7, the flow rate and pressure of the hydrogen gas are accurately controlled. Thus, the injector 28 directly drives the valve (the valve body and the valve seat) by the electromagnetic driving force to open or close the valve, and the driving period can be controlled even in a high-response region, so that the injector has a high response.

It is to be noted that when the injector 28 opens or closes the valve body, the gas flow rate is regulated, and the pressure of the gas supplied to the downstream side of the injector 28 is reduced as compared with the gas pressure on the upstream side of the injector 28, so that the injector 28 can be considered as a pressure regulation valve (a pressure reduction valve, a regulator). Moreover, in the present embodiment, the injector can be considered as a variable pressure regulation valve capable of changing the pressure regulation amount (the pressure reduction amount) of the upstream gas pressure of the injector 28 so that the pressure agrees with a demanded pressure in a predetermined pressure range in accordance with a gas demand.

In the present embodiment, this injector 28 is disposed on the upstream side from the joining part A1 between the hydrogen supply passage 22 and the circulation passage 23 (see FIG. 1). Moreover, as shown by a broken line in FIG. 1, when a plurality of fuel tanks 21 are used as fuel supply sources, the injector 28 is disposed on the downstream side from a part (a hydrogen gas joining part A2) where the hydrogen gases supplied from these fuel tanks 21 join one another.

The circulation passage 23 is connected to the gas/water discharge passage 25 through the gas-liquid separation unit 30 and a gas/water discharge valve 31. The gas-liquid separation unit 30 collects a water content from the hydrogen off gas. When the gas/water discharge valve 31 receives a command from the control unit 7 to operate, the water content collected by the gas-liquid separation unit 30 and the hydrogen off gas (the fuel off gas) including impurities in the circulation passage 23 are discharged (purged) to the outside. When this gas/water discharge valve 31 is opened, the concentration of the impurities in the hydrogen off gas of the circulation passage 23 decreases, and the concentration of hydrogen in the circulated and supplied hydrogen off gas increases. An upstream pressure sensor 32 and a downstream pressure sensor 33 for detecting the pressures of the hydrogen off gas are provided in the upstream position (on the circulation passage 23) and the downstream position (on the gas/water discharge passage 25) of the gas/water discharge valve 31, respectively.

Moreover, although not particularly specifically shown, the hydrogen off gas discharged through the gas/water discharge valve 31 and the gas/water discharge passage 25 is diluted by a diluter (not shown) to join the oxidizing off gas in the exhaust passage 12. The hydrogen pump 24 is driven by a motor (not shown) to circulate and supply the hydrogen gas from a circulation system to the fuel cell 2. The circulation system of the hydrogen gas is constituted by a passage of the hydrogen supply passage 22 on the downstream side from the joining part A1, a fuel gas passage formed in the separators of the fuel cell 2, and the circulation passage 23.

The refrigerant piping system 5 has a refrigerant passage 41 which communicates with a cooling passage in the fuel cell 2, a cooling pump 42 provided in the refrigerant passage 41, a radiator 43 which cools the refrigerant discharged from the fuel cell 2, and a temperature sensor 44 which detects the temperature of the refrigerant discharged from the fuel cell 2. The cooling pump 42 is driven by a motor (not shown) to circulate and supply the refrigerant from the refrigerant passage 41 to the fuel cell 2. The temperature of the refrigerant detected by the temperature sensor 44 (=the temperature of the hydrogen off gas discharged from the fuel cell 2) is used in the purge control described later.

The power system 6 includes a high-pressure DC/DC converter 61, a battery 62, a traction inverter 63, a traction motor 64, various auxiliary machine inverters (not shown) and the like. The high-pressure DC/DC converter 61 is a direct-current voltage converter, and has a function of regulating a direct-current voltage input from the battery 62 to output the voltage to a traction inverter 63 side and a function of regulating a direct-current voltage input from the fuel cell 2 or the traction motor 64 to output the voltage to the battery 62. The charging/discharging of the battery 62 is realized by these functions of the high-pressure DC/DC converter 61. Moreover, the high-pressure DC/DC converter 61 controls the output voltage of the fuel cell 2.

The battery 62 has a constitution in which battery cells are stacked, and a constant high voltage is considered as a terminal voltage, so that the battery can be controlled by a battery computer (not shown) to charge a surplus power or subsidiarily supply the power. The traction inverter 63 converts a direct current into a three-phase alternate current to supply the current to the traction motor 64. The traction motor 64 is, for example, a three-phase alternate current motor, and constitutes a main power source of the fuel cell hybrid vehicle in which the fuel cell system 1 is mounted.

The auxiliary machine inverter is a motor control unit for controlling the driving of each motor, and converts the direct current into the three-phase alternate current to supply the current to the motor. The auxiliary machine inverter is, for example, a pulse width modulation (PWM) system inverter, and converts the direct-current voltage output from the fuel cell 2 or the battery 62 into the three-phase alternate-current voltage in accordance with a control command from the control unit 7 to control a rotary torque generated in each motor.

The control unit 7 detects the operation amount of an operation member (an accelerator or the like) for acceleration provided in the vehicle, and receives control information such as a demanded acceleration value (e.g., a demanded power generation amount from a load device such as the traction motor 64) to control the operation of various devices in the system. It is to be noted that the load devices are, in addition to the traction motor 64, power consumption devices including auxiliary machines (e.g., the motors of the compressor 14, the hydrogen pump 24 and the cooling pump 42, etc.) necessary for operating the fuel cell 2; actuators for use in various devices (a change gear, a wheel control device, a steering device, a suspension device, etc.) associated with the running of the vehicle; an air conditioning device (an air conditioner), a light fixture and an audio of a passenger space and the like.

This control unit 7 is constituted of a computer system (not shown). Such a computer system includes a CPU, an ROM, an RAM, an HDD, an input/output interface, a display and the like, and the CPU reads various control programs recorded in the ROM to execute desired calculation, thereby performing various processing and control such as feedback control and purge control.

Next, there will be described a constitution for calculating the completion of activation in the vehicle (a fuel cell hybrid car) in which the fuel cell system 1 described above is mounted (see FIG. 2, etc.).

The fuel cell hybrid car of the present embodiment is provided with a gauge G for displaying the activation state of the fuel cell 2 at the start of the activation of the fuel cell system 1. This gauge G has a display section which displays, as a starting point, the temperature of the fuel cell 2 and which displays, as an end point, the temperature of the fuel cell 2 at the completion of the activation (see FIG. 2, etc.), and the gauge is provided in a position which can visually be recognized by a driver or the like, for example, an instrument panel of a driver's seat of the fuel cell hybrid car or the like. Incidentally, in the present embodiment, an integrating indicator is displayed near the bottom portion of the gauge G, and the schematic diagram of the fuel cell 2 is displayed near an upper left portion as one faces, respectively (see FIG. 2, etc.).

Figure 2:
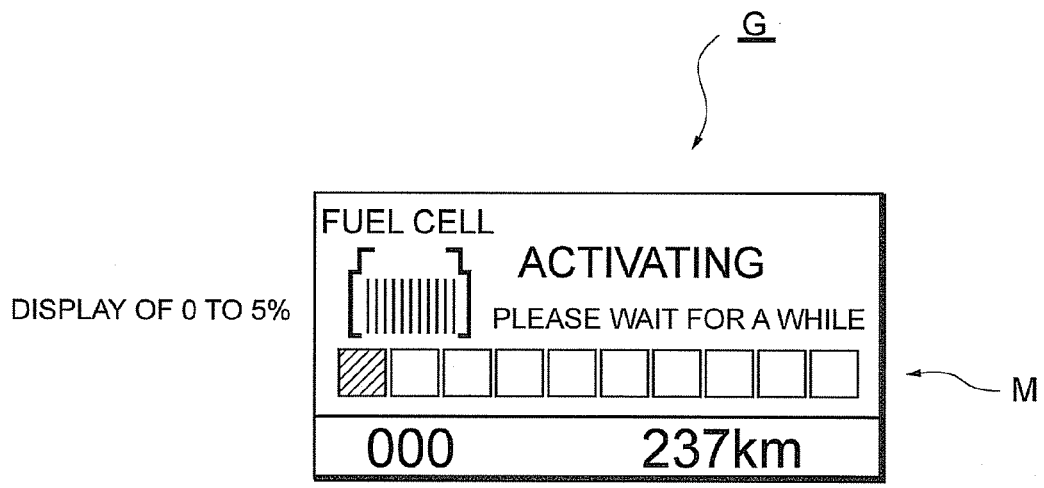
FIG. 2 is a schematic diagram of one example of a gauge in the embodiment of the present invention showing an activating completion state of 0 to 5%.
Figure 3:
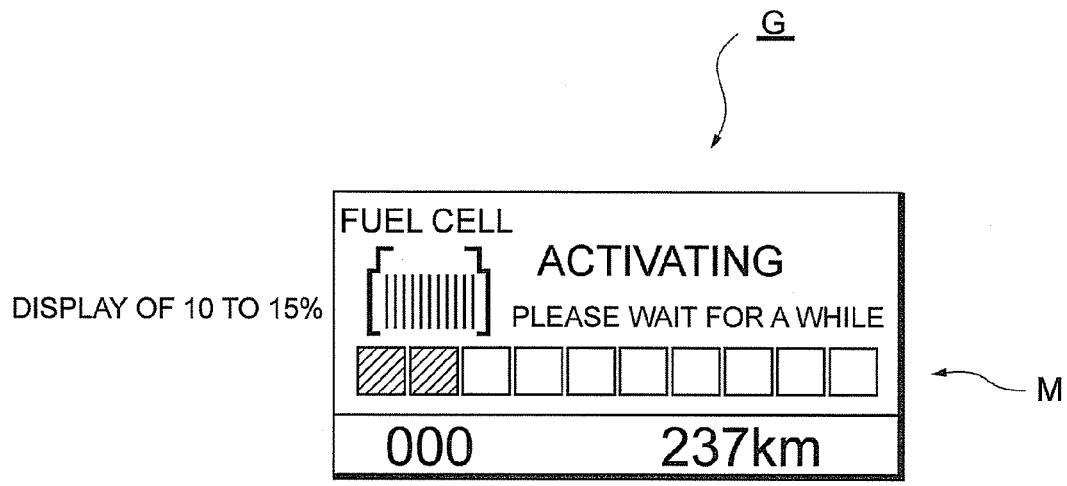
FIG. 3 is a schematic diagram showing the gauge displaying an activating completion state of 10 to 15%.
Figure 4:
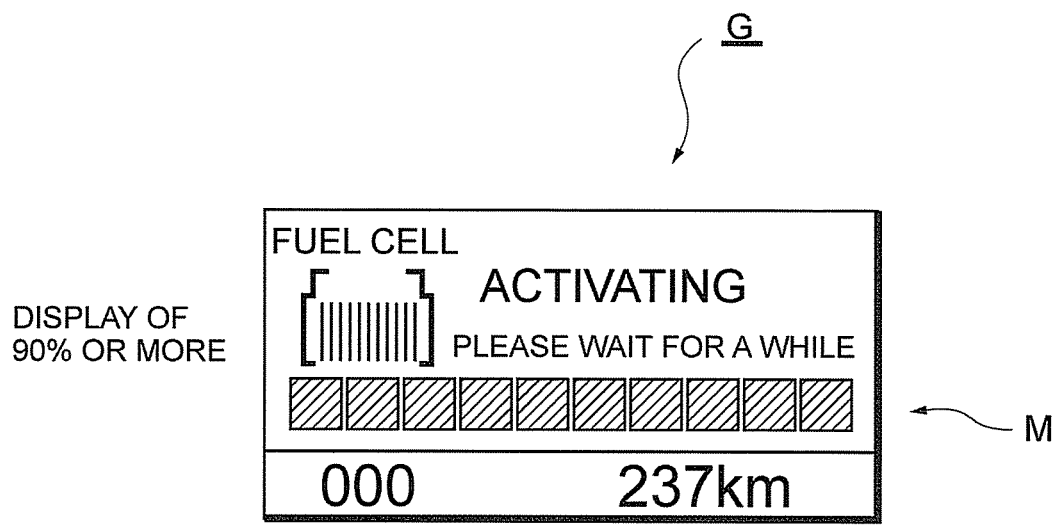
FIG. 4 is a schematic diagram showing the gauge displaying an activating completion state of 90% or more.

The gauge G of the present embodiment is constituted of, for example, a meter M which extends in a transverse direction (see FIG. 2, etc.). This meter M includes, for example, a plurality of rectangular display sections which blink, and an amount (a numeral) is lit in accordance with the temperature of the fuel cell 2.

Moreover, in the fuel cell system 1 of the present embodiment, at the start of low-temperature activation (the activation in a low-temperature situation) and the start of activation for a failure check (the activation for checking the failure of the fuel cell 2), the time for the completion of the activation to be transmitted to the gauge G is switched. The calculation method of the time for the completion of the activation at each start of the activation will be illustrated as follows. It is to be noted that hereinafter, the fuel cell is described as the FC sometimes.

(1) Start of Low-Temperature Activation

The progress degree of the completion of the activation is displayed by using a ratio calculated from the FC temperature or the like. Specifically, the progress degree is calculated by the following equation.

> The progress degree of the completion of the activation=(the current FC temperature−the FC temperature at the start of the activation)/(a ready-on target temperature−a temperature at the start of the activation)

As the calculated progress degree of the completion of the activation (the time for the completion of the activation) increases, the number of the lit portions of the meter M of the gauge G increases.

Thus, in the present embodiment, the current position of the fuel cell temperature is displayed on the gauge G which displays, as the starting point, the fuel cell temperature (the FC temperature) at the start of the activation and which displays, as the end point, the FC temperature at the completion of the activation. In this case, the time till the completion of the activation is not estimated, but when the ratio of the temperature is only seen, the estimated time till the completion of the activation can be informed, whereby an adverse affect due to a low accuracy in the case of the estimation of the time can be eliminated.

(2) Start of Activation for Failure Check

At the start of the activation for the failure check, the progress degree of the completion of the activation is calculated by "the progress degree with respect to the estimated time till the completion of the activation". As apparent from the following equation, this progress degree is the percentage of an actually elapsed time with respect to a time required to complete the failure check. That is, here the progress degree is calculated by the following equation.

> The progress degree of the completion of the activation=(the time elapsed from the start of the activation)/(the estimated time of the activation for the failure check)

As the calculated progress degree of the completion of the activation (the time for the completion of the activation) increases, the number of the lit portions of the meter M of the gauge G increases.

(3) A Case Where Demand for Both the Above (1) and (2) is Generated:

In the fuel cell system 1, when both the demand for the above (1) the low-temperature activation and the demand for the above (2) the activation for the failure check are simultaneously generated, the minimum value of both values is employed in the present embodiment. That is, after calculating both the progress degree of the completion of the activation based on (1) and the progress degree of the completion of the activation based on (2), the smaller value (the progress degree) of both the values is displayed on the gauge G. According to this, the displaying of the progress degree higher than an actual degree based on one of the calculation methods is avoided.

(4) Display of Activation Time

Moreover, much time is required for obtaining a ready-on state at the start of the activation for warm-up or at the next start of the activation after the previous generation of trip failure sometimes, and hence this is notified by display in the present embodiment. In this case, at a timing to switch to an activation time display screen, a screen display request is transmitted to the meter M. When the following switch conditions are established, the screen display is performed.

<A Case Where the Switch Conditions are Established>

"The low-temperature activation is necessary" or "the failure check is performed at the start of the activation", and "a ready lamp blinks (=activating)".

<A Case Where the Switch Conditions are Not Established>

The above switch conditions are not established, or "the ready lamp is lit".

As described above, in the fuel cell system 1 of the present embodiment, when the time for the completion of the activation of the fuel cell 2 at the start of the low-temperature activation is calculated and displayed, the time is not estimated, but the only temperature ratio is checked and displayed on the gauge G, so that the time till the completion of the activation of the fuel cell 2 can accurately be displayed. That is, in the present embodiment, the time is not estimated, but the time for the completion of the activation is calculated by using the temperature as a parameter, and the ratio of the temperature is displayed to display a situation till the completion of the activation. Therefore, as compared with a case where the time is estimated from the temperature, the time required for the completion of the activation can simply and accurately be informed. As described above, in the present situation, it is difficult to predict the time required for the activation of the fuel cell 2 from the temperature, but according to the fuel cell system 1 of the present embodiment, the user can correctly be informed of a waiting time at the start of the activation. In addition, as described above, in the present embodiment, the time is not calculated, but the temperature is indicated to display an activating situation (at the start of the low-temperature activation), so that there is an advantage that processing for the time calculation is minimized.

It is to be noted that the above embodiment is merely one example of the preferable embodiment of the present invention, but the present invention is not limited to this embodiment, and can variously be modified without departing from the scope of the present invention. For example, in the present embodiment, there has been described a case where messages near the meter M on the gauge G are Japanese (see FIG. 2, etc.), but these messages may be indicated in English or the like.

INDUSTRIAL APPLICABILITY

According to the present invention, the progress of activation can appropriately be transmitted in accordance with the situation of the temperature rise of a fuel cell, so that an estimated time till the completion of the activation can be displayed with higher accuracy.

Therefore, the present invention can broadly be utilized in such a demanded fuel cell system.

The invention claimed is:

1. A fuel cell system comprising a fuel cell which generates a power by the electrochemical reaction of a fuel gas and an oxidizing gas, the fuel cell system further comprising:

a control unit programmed to calculate a ratio of a difference between a current fuel cell temperature and a fuel cell temperature at a start of activation against a difference between a fuel cell temperature at a completion of activation and the fuel cell temperature at the start of activation; and a display device configured to display the ratio of the difference between the current fuel cell temperature and the fuel cell temperature at a start of activation against the difference between the fuel cell temperature at the completion of activation and the fuel cell temperature at the start of activation on a gauge having a starting point as the fuel cell temperature at the start of activation and an end point as the fuel cell temperature at the completion of activation, the current fuel cell temperature differing from the fuel cell temperature at a completion of activation and the fuel cell temperature at the start of activation, wherein the fuel cell temperature at the completion of activation is a predetermined value representing the completion condition.

2. The fuel cell system according to claim 1, wherein the display device is configured to display on the gauge a percentage of an actually elapsed time with respect to a time required to complete a failure check of the fuel cell.

3. The fuel cell system according to claim 2, wherein the display device is configured to display on the gauge the smaller value between a value of the percentage of the actually elapsed time with respect to the time required to complete the failure check and a value of a current percentage of the temperature of the fuel cell.

4. An activating completion degree displaying method of a fuel cell system, comprising:
    calculating with a control unit a ratio of difference between a current fuel cell temperature and a fuel cell temperature at a start of activation against a difference between a fuel cell temperature at a completion of activation and the fuel cell temperature at the start of activation; and
    displaying the ratio of the difference between the current fuel cell temperature and the fuel cell temperature at the start of activation of the fuel cell against the difference between the fuel cell temperature at the completion of activation and the fuel cell temperature at the start of activation of the fuel cell on a gauge having a starting point as the fuel cell temperature at the start of activation and an end point as the fuel cell temperature at the completion of activation, the current fuel cell temperature differing from the fuel cell temperature at a completion of activation and the fuel cell temperature at the start of activation, wherein the fuel cell temperature at the completion of activation is a predetermined value representing the completion condition.

5. The activating completion degree displaying method of the fuel cell system according to claim 4, further comprising:
    displaying, on the gauge, the percentage of an actually elapsed time with respect to a time required to complete a failure check at the start of the activation for the failure check.

6. The activating completion degree displaying method of the fuel cell system according to claim 5, further comprising:
    comparing the percentage of the actually elapsed time with respect to the time required to complete the failure check with the percentage of the fuel cell temperature; and displaying the smaller value.

* * * * *